US009743795B2

(12) United States Patent
Chen et al.

(10) Patent No.: US 9,743,795 B2
(45) Date of Patent: Aug. 29, 2017

(54) ELECTRIC COOKING DEVICE (71) Applicant: MIDEA GROUP CO., LTD., Beijiao (CN)

(72) Inventors: Pingtao Chen, Beijiao (CN); Jinshui Wu, Beijiao (CN)

(73) Assignee: MIDEA GROUP CO., LTD., Foshan (CN)

( * ) Notice: Subject to any disclaimer, the term of this patent is extended or adjusted under 35 U.S.C. 154(b) by 703 days.

(21) Appl. No.: 14/054,147

(22) Filed: Oct. 15, 2013

(65) Prior Publication Data

US 2014/0116261 A1    May 1, 2014

(30) Foreign Application Priority Data

Oct. 25, 2012  (CN) .......................... 2012 1 0415040
Apr. 10, 2013  (CN) ...................... 2013 2 0179101 U
May 10, 2013  (CN) ...................... 2013 2 0255906 U
May 20, 2013  (CN) ...................... 2013 2 0278211 U (51) Int. Cl.
A47J 37/07    (2006.01)
G07F 9/10     (2006.01)
A47J 37/12    (2006.01)
A21B 1/00     (2006.01)
F27D 11/00    (2006.01)
A47J 27/122   (2006.01)

(52) U.S. Cl.
CPC .................................. *A47J 27/122* (2013.01)

(58) Field of Classification Search
None
See application file for complete search history.

(56) References Cited

U.S. PATENT DOCUMENTS

| | | | | |
|---|---|---|---|---|
| 1,428,825 A | * | 9/1922 | Bindon | F24C 7/04 219/394 |
| 2,105,814 A | * | 1/1938 | Lent | H05B 3/00 219/452.13 |
| 2,576,409 A | * | 11/1951 | Michaelis | A47B 77/08 126/211 |
| 2,612,590 A | * | 9/1952 | Lachowicz | F24C 7/00 126/37 R |
| 3,746,837 A | * | 7/1973 | Frey | A47J 37/0611 219/387 |
| 3,971,629 A | * | 7/1976 | Buix | A61L 2/26 211/126.1 |
| 4,315,138 A | * | 2/1982 | Miwa | A47J 27/62 219/433 |
| 4,539,469 A | * | 9/1985 | Gigandet | F24C 15/006 219/388 |
| 5,329,418 A | * | 7/1994 | Tanabe | G06F 1/20 361/695 |

(Continued)

FOREIGN PATENT DOCUMENTS

CN    201153854    11/2008
CN    201328691    10/2009

(Continued)

*Primary Examiner* — David Angwin
*Assistant Examiner* — Gyounghyun Bae
(74) *Attorney, Agent, or Firm* — Hodgson Russ LLP (57) ABSTRACT An electric cooking device (1) includes a plurality of electric cookers (11) which are capable of cooking ingredients therein independently, in which adjacent electric cookers (11) are detachably connected with each other.

19 Claims, 6 Drawing Sheets

(56) References Cited

U.S. PATENT DOCUMENTS

| | | | | |
|---|---|---|---|---|
| 5,747,734 A * | 5/1998 | Kozlowski | ............ | H02B 1/305 174/37 |
| 5,957,557 A * | 9/1999 | Langer | ............ | A47B 77/08 220/4.02 |
| 6,033,257 A * | 3/2000 | Lake | ............ | G05B 19/0423 439/502 |
| 6,283,014 B1 * | 9/2001 | Ng | ............ | A47J 27/086 219/431 |
| 6,328,597 B1 * | 12/2001 | Epps | ............ | H01R 13/4538 439/141 |
| 7,033,209 B2 * | 4/2006 | Swiatek | ............ | B62J 99/00 439/502 |
| 7,708,008 B2 * | 5/2010 | Elkasevic | ............ | F24C 15/006 126/19 R |
| 8,007,130 B2 * | 8/2011 | Wu | ............ | H01R 33/955 362/249.06 |
| 8,168,923 B2 * | 5/2012 | Wong | ............ | H05B 3/34 219/387 |
| 2002/0152897 A1 * | 10/2002 | Bouly | ............ | A47J 37/1276 99/337 |
| 2002/0153366 A1 * | 10/2002 | Glucksman | ............ | A47J 37/0611 219/450.1 |
| 2006/0049164 A1 * | 3/2006 | Bryan | ............ | A47J 37/0611 219/386 |
| 2007/0277678 A1 * | 12/2007 | Mangano | ............ | A47J 37/0611 99/426 |
| 2012/0070556 A1 * | 3/2012 | Wilson | ............ | A47J 33/00 426/523 |
| 2013/0038193 A1 * | 2/2013 | Dawson | ............ | F25D 23/126 312/405.1 |
| 2014/0263276 A1 * | 9/2014 | Harward | ............ | F24C 15/108 219/454.12 |
| 2014/0345594 A1 * | 11/2014 | Rhodes | ............ | A47J 37/0704 126/25 R |
| 2014/0361001 A1 * | 12/2014 | Day | ............ | H01F 38/14 219/428 |

FOREIGN PATENT DOCUMENTS

| | | |
|---|---|---|
| CN | 102133038 | 7/2011 |
| CN | 202060585 | 12/2011 |
| CN | 202919917 | 5/2013 |

* cited by examiner

ELECTRIC COOKING DEVICE

CROSS REFERENCE TO RELATED APPLICATIONS

This application claims priority of the following applications: (1) Chinese Application No. 201210415040.3 filed Oct. 25, 2012; (2) Chinese Application No. 201320179101.0 filed Apr. 10, 2013; (3) Chinese Application No. 201320255906.9 filed May 10, 2013; and (4) Chinese Application No. 201320278211.2 filed May 20, 2013, the entire disclosures of which are incorporated by reference herein.

FIELD

Embodiments of the present invention generally relate to a cooking device, more particularly to an electric cooking device.

BACKGROUND

The electric cooking device is a widely used cooking device. In the related art, the electric cooking device having a plurality of inner pots has a generally integral structure, in which the plurality of inner pots are placed in a single and integral outer pot. This kind of electric cooking device can only be used as an integral one, thus occupying a larger space and being inconvenient for use.

SUMMARY

Embodiments of the present invention provide an electric cooking device comprising a plurality of electric cookers which are capable of cooking ingredients therein independently, in which adjacent electric cookers are detachably connected with each other.

With the electric cooking device according to embodiments of the present invention, each of the plurality of electric cookers may be used to cook ingredients independently. In addition, adjacent electric cookers are detachably connected, so that a desired number of the electric cookers can be combined to cook ingredients as desired. Thus, the electric cookers of the electric cooking device can be combined freely, and the electric cooking device is convenient for use and improves the space utilization.

DETAILED DESCRIPTION

Reference will be made in detail to embodiments of the present invention. The embodiments described herein with reference to drawings are explanatory, illustrative, and used to generally understand the present invention. The embodiments shall not be construed to limit the present invention. The same or similar elements and the elements having same or similar functions are denoted by like reference numerals throughout the descriptions.

The electric cooking device according to embodiments of the present invention will be described with reference to the drawings.

As shown in FIGS. 1-8, an electric cooking device 1 according to embodiments of the present invention comprises a plurality of electric cookers 11 which are capable of cooking ingredients therein independently. Adjacent electric cookers 11 are detachably connected with each other. By way of example and without limitation, the electric cooker 11 may be a slow cooker.

When cooking, a desired number of the electric cookers 11 may be combined, that is, a desired number of the electric cookers 11 are connected, for example, connected in turn to cook ingredients. Each of the electric cookers 11 may be controlled independently to cook ingredients. For example, each of the electric cookers 11 may be connected with a power cable 130. Specifically, each of the electric cookers 11 is detachably connected with the power cable 130, and the power cable 130 of each electric cooker 11 may be connected with a power source(not shown) directly, so that each of the plurality of electric cookers 11 may be used to cook ingredients independently.

In some embodiments, each of the electric cookers 11 comprises a control knob 12 configured to turn on and turn off the electric cooker 11. Further, the control knob 12 can be used to adjust the power level of the electric cooker 11.

In some embodiments, each of the electric cookers 11 comprises an outer pot 102 and at least one inner pot 101 adapted to place in the outer pot 102. The inner pot 101 is used to contain ingredients and generally equipped with a cover 103 for covering the inner pot 101. The outer pot 102 defines a cavity for placing the inner pot 101 therein.

The electric cooker 11 comprises an electric heater disposed in the outer pot 101 for heating the inner pot 101, thus cooking ingredients in the inner pot 101. When the cooking is finished, the inner pot 101 may be taken out of the cavity. As shown in FIGS. 1-8, one inner pot 101 is placed in the outer pot 102 of each electric cooker 11. Alternatively, a plurality of inner pots 101 may be placed in the outer pot 102 of each electric cooker 11. In this example, a plurality of cavities may be defined in each outer pot 102 so as to contain the plurality of inner pots 101 respectively; alternatively, the cavity of each outer pot 102 is divided into a plurality of regions for containing the plurality of inner pots 101 respectively.

As shown in FIGS. 1-8, in some embodiments, each of the electric cookers 11 has a substantially rectangular cross-section, a substantially circular cross-section, or a substantially oval cross-section. In one example, the electric cooker 11 has a substantially rectangular cross-section, in other words, the outer pot 102 of the electric cooker 11 has a substantially cuboid shape. Alternatively, the electric cooker 11 may have substantially circular cross-section or a substantially oval cross-section, i.e., the outer pot 102 has a substantially circular cross-section or a substantially oval cross-section. Advantageously, the inner pot 101 has a circular cross-section.

With the electric cooking device 1 according to embodiments of the present invention, adjacent electric cookers 11 are detachably connected to each other, and each of the electric cookers 11 may be used to cook ingredients independently. Thus, a desired number of the electric cookers 11 can be combined and connected as desired.

When the cooking is finished, the connected electric cookers 11 may be disconnected from each other, thus facilitating transportation and storage of the electric cooking device 1 and reducing a space occupied by the electric cooking device 1.

Further, the electric cookers 11 can be combined and connected in accordance with the shape of a kitchen table (not shown) where the electric cooking device 1 is placed, such that the shape of the electric cooking device 1 matches the shape of the kitchen table. Thus, the electric cookers 11 of the electric cooking device 1 may be combined freely, and the electric cooking device 1 is convenient for use. In addition, the space occupied by the electric cooking device 1 is reduced, thus the space utilization of the electric cooking device 1 is improved.

An electric cooking device 1 according to a specific embodiment of the present invention will be described with reference to FIGS. 1-6.

In this embodiment, by way of example and without limitation, the electric cooking device 1 comprises four electric cookers 11. The outer pot 102 of the electric cooker 11 has a substantially rectangular cross-section and the inner pot 101 of the electric cooker 11 has a circular cross-section.

As shown in FIGS. 1-6, each of the electric cookers 11 has a first side 110 and a second side 120. A first electric connector 112 is disposed on the first side 110 and a second electric connector 122 is disposed on the second side 120. The first electric connector 112 of one electric cooker (for example, the left electric cooker in FIG. 2) of the adjacent electric cookers is adapted to connect with the second electric connector 122 of the other electric cooker (for example, the right electric cooker in FIG. 2) of the adjacent electric cookers.

When the four electric cookers 11 of the electric cooking device 1 are connected in turn, the adjacent electric cookers are electrically connected by means of the first the electric connector 112 of the one electric cooker and the second the electric connector 122 of the other electric cooker. In one embodiment, one of the four electric cookers 11 is connected with a power source via a power cable 130, and the power source may supply power to not only the electric cooker 11 connected with the power source, but also the remaining electric cookers 11 via the first electric connector 112 and the second electric connector 122. In one embodiment, each of the electric cookers 11 may be turned on or turned off by the control knob 12, thus further simplifying the structure of the electric cooking device 1, moreover, the electric cookers 11 may be controlled independently to cook.

In some embodiments, the adjacent electric cookers 11 are detachably connected by means of the first the electric connector 112 of the one electric cooker and the second the electric connector 122 of the other electric cooker. In other words, the first electric connector 112 and the second electric connector 122 are used not only to transmit electricity between adjacent electric cookers 11, but also to detachably connect adjacent electric cookers 11, thereby the structure of the electric device 1 may be further simplified.

In some embodiments, the first electric connector 112 is a magnetic socket, and the second electric connector 122 is a magnetic plug. The magnetic plug may be inserted into the magnetic socket, so as to transmit electricity between the adjacent electric cookers 11 and to detachably connect the adjacent electric cookers 11.

As shown in FIGS. 2-5, each of the electric cookers 11 comprises a protrusion 111 disposed on the first side 110 and a recess 121 disposed in the second side 120. The first electric connector 112 is disposed on the protrusion 111 and the second electric connector 122 is disposed in the recess 121. The protrusion 111 of one electric cooker 11 of the adjacent electric cookers 11 is adapted to fit within the recess 121 of the other electric cooker 11 of the adjacent electric cookers. Thereby, as the protrusion 111 is inserted into the recess 121, the first electric connector 112 of one electric cooker is connected with the second electric connector 122 of the other electric cooker. The protrusion 111 and the recess 121 assist connecting the first electric connector 112 of the one electric cooker to the second electric connector 122 of the other electric cooker, thus improving the reliability of the electric cooking device 1.

Figure 1:
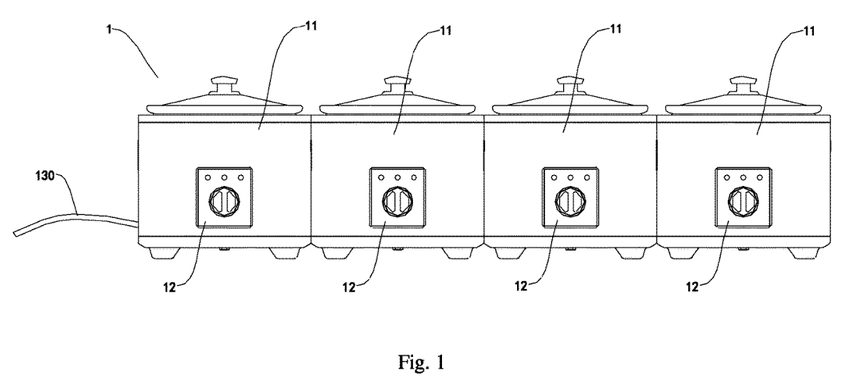
FIG. 1 is a schematic view of an electric cooking device according to an embodiment of the present invention.
Figure 2:
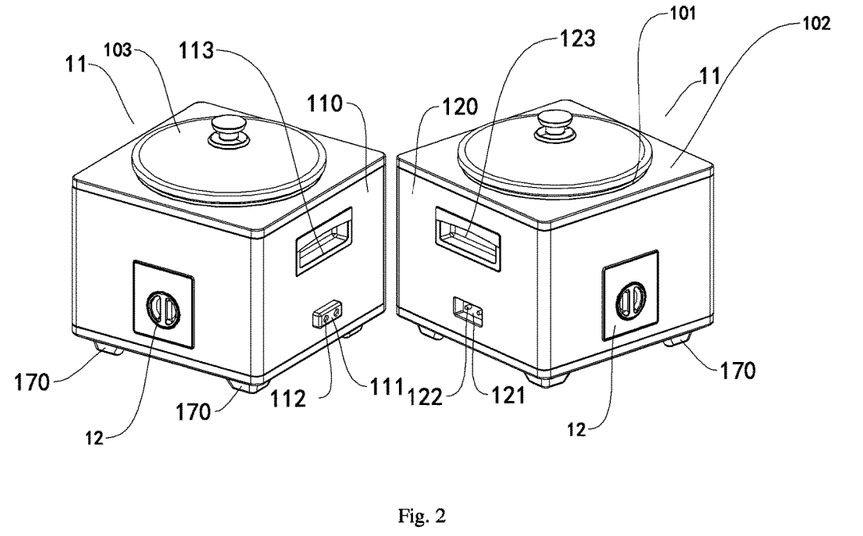
FIG. 2 is a schematic view of two electric cookers of an electric cooking device according to an embodiment of the present invention, in which the two electric cookers are in a disconnected state.

In some embodiments, the first side 110 of each electric cooker 11 is opposed to the second side 120 thereof, so that the electric cookers 11 are detachably connected in turn so as to form an electric cooker row, as shown in FIG. 1.

A power cable 130 is detachably connected with one of the first electric connector 112 of the electric cooker located at a first end (for example, the left end in FIG. 1) of the electric cooker row and the second electric connector 122 of the electric cooker located at a second end (for example, the right end in FIG. 1) of the electric cooker row.

Figure 6:
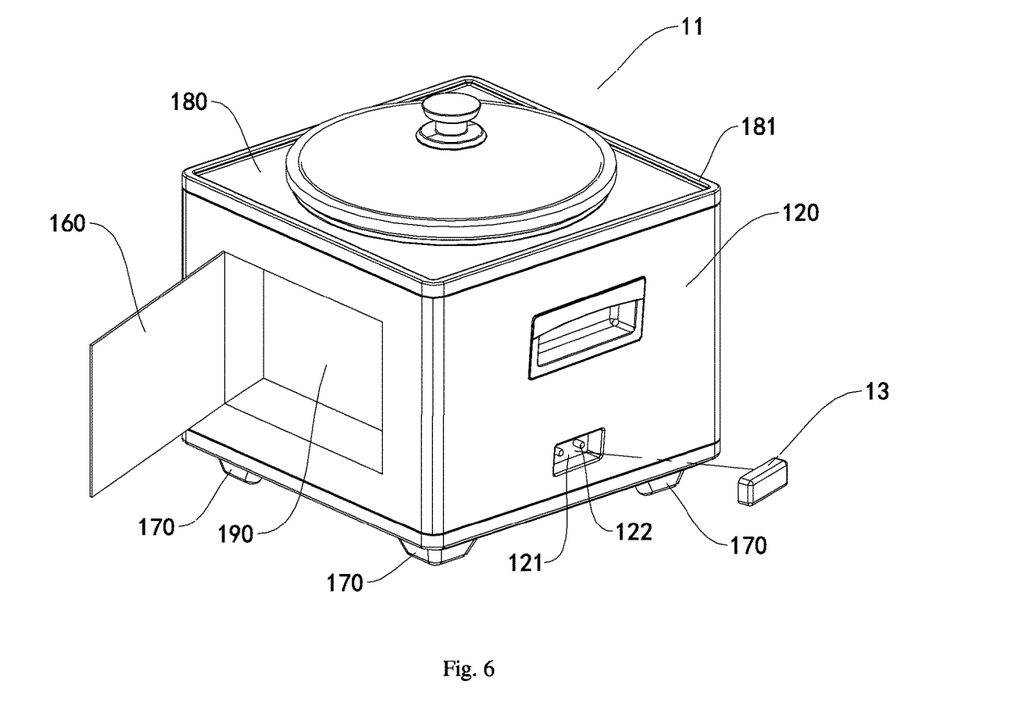
FIG. 6 is a schematic view of an electric cooker of an electric cooking device according to another embodiment of the present invention.

In this way, when the plurality of electric cookers 11 are connected and the power cable 130 is connected to a power source, the power electricity may be supplied to the plurality of electric cookers 11. The other one of the first electric connector 112 of the electric cooker located at the first end of the electric cooker row and the second electric connector 122 of the electric cooker located at the second end of the electric cooker row may be sealed by a cover 13 (as shown in FIG. 6), or connected to a power cable 130 which may be used as a standby power cable of the electric cooking device 1.

In one embodiment, the power cable 130 is detachably connected with the first electric connector 112 and the second electric connector 122 respectively. It should be understood that, each of the electric cookers 11 may be connected detachably with a power cable 130.

Those having the ordinary skills in the art will understand that the first side 110 and the second side 120 may be adjacent to each other. In one embodiment, the electric cooker 11 has a substantially circular or oval cross-section, i.e. the electric cooker 11 has a substantially cylindrical or elliptic cylindrical shape. Thus the first and second sides 110, 120 should be understood as two planes tangent to the outer surface of the electric cooker 11, and the two planes may form a predetermined angle therebetween or be parallel with each other.

Figure 5:
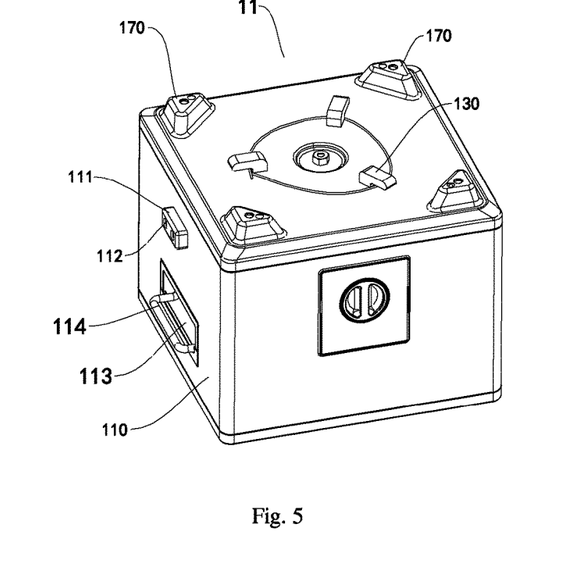
FIG. 5 is a bottom perspective view of an electric cooker of an electric cooking device according to an embodiment of the present invention.

In some embodiments, as shown in FIG. 5, each electric cooker comprises a cable-winding bracket 140 configured to wind the power cable 130 thereon. Specifically, the cable-winding bracket 140 may be disposed on the outside surface or the bottom surface of the electric cooker 11. In one embodiment, the cable-winding bracket 140 is disposed on the bottom surface of the electric cooker 11, thus the aesthetics of the electric cooking device 1 is improved. The power cable 130 may be wind around the cable-winding bracket 140 when the electric cooking device 1 is not connected with the power source, thus avoiding damage to the power cable 130 due to disordered arrangement of the power cable 130, and facilitating the storage of the electric cooking device 1.

In some embodiments, as shown in FIG. 6, each of the electric cookers 11 comprises a cable receiving cavity 190 configured to receive the power cable 130, and a door 160 configured to open or close the cable receiving cavity 190. When the electric cooking device 1 is not in use, the power cable 130 may be detached and received in the cable receiving cavity 190, and the cable receiving cavity 190 is closed by the door 160, thus not only preventing the power cable 130 from being damaged, but also facilitating the storage of electric cooking device 1.

Figure 3:
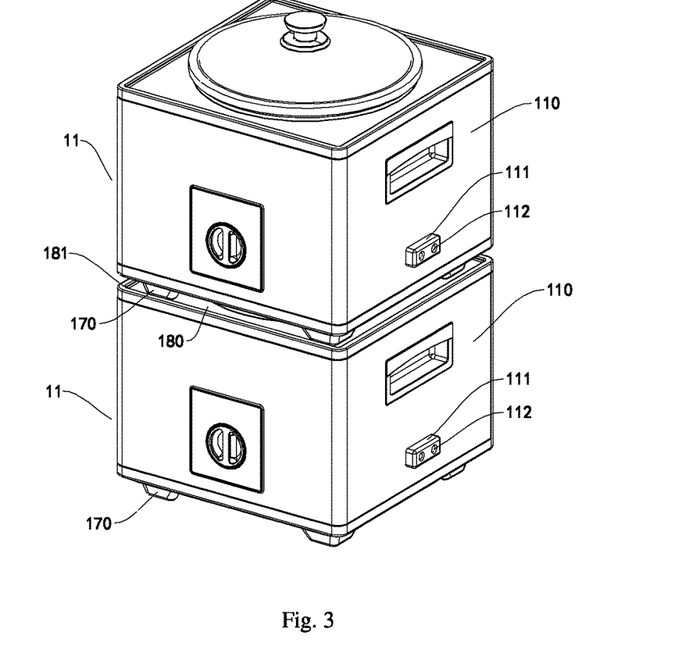
FIG. 3 is a schematic view of two electric cookers of an electric cooking device according to an embodiment of the present invention, in which the two electric cookers are in a stacked state.
Figure 4:
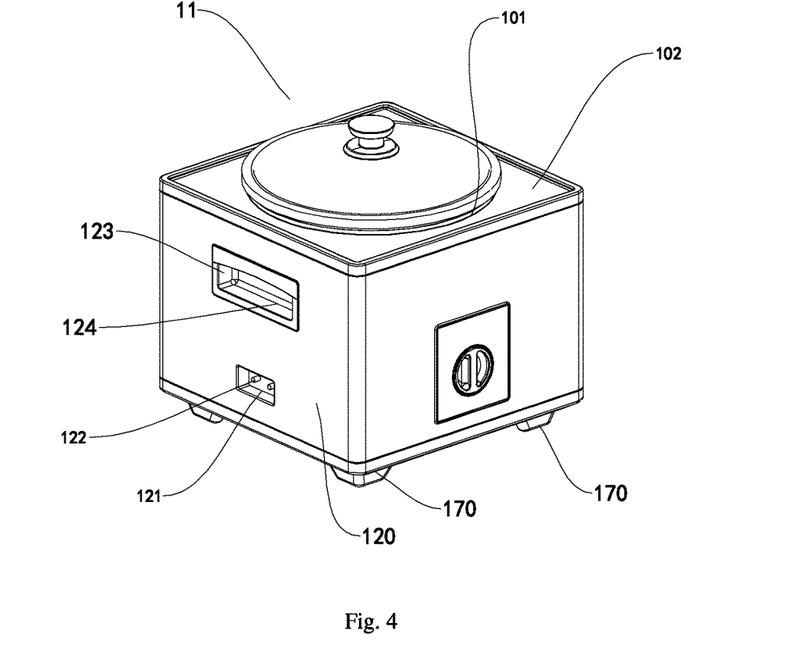
FIG. 4 is a top perspective view of an electric cooker of an electric cooking device according to an embodiment of the present invention.

In some embodiments of the present invention, when the electric cooking device 1 is not in use, the plurality of electric cookers 11 may be disconnected from each other and stacked together, as shown in FIG. 3. Thus, it is more convenient to store the electric cooking device 1.

In some embodiments, as shown in FIGS. 2-5, each of the electric cookers 11 comprises legs 170 on a bottom surface thereof and a retaining groove 180 in an upper surface thereof. When one electric cooker is stacked on another electric cooker, the retaining groove 180 of the another electric cooker retains the leg 170 of the one electric cooker 11, thus improving the reliability of the storage of the electric cooking device 1.

In some embodiments, a flange 181 is formed on the upper surface of each of the electric cookers 11 to define the retaining groove 180. Alternatively, a recess configured to position the leg 170 is formed in the upper surface of the one electric cooker 11.

In some embodiments, each of the electric cookers 11 comprises first and second gripping grooves 113, 123 opposed to each other, for conveying the electric cooker 11. The users can put their hands in the first and second gripping grooves 113, 123, thus conveying the electric cooker 11 more conveniently. In one embodiment, each of the electric cookers defines first and second sides 110, 120 opposed to each other, the first gripping groove 113 is formed in the first side 110, and the second gripping groove 123 is formed in the second side 120. Alternatively, the first gripping groove 113 is formed in a side of the electric cooker 11 adjacent to the first side 110, and the second gripping groove 123 is formed in a side of the electric cooker 11 adjacent to the second side 120.

In some embodiments, the electric cooker 11 further comprises a first handle 114 disposed in the first gripping groove 113 and capable of extending out of and retracting into the first gripping groove 113, and a second handle 124 disposed in the second gripping groove 123 and capable of extending out of and retracting into the second gripping groove 123. Thereby, the user may convey the electric cooker 11 more conveniently.

Figure 7A:
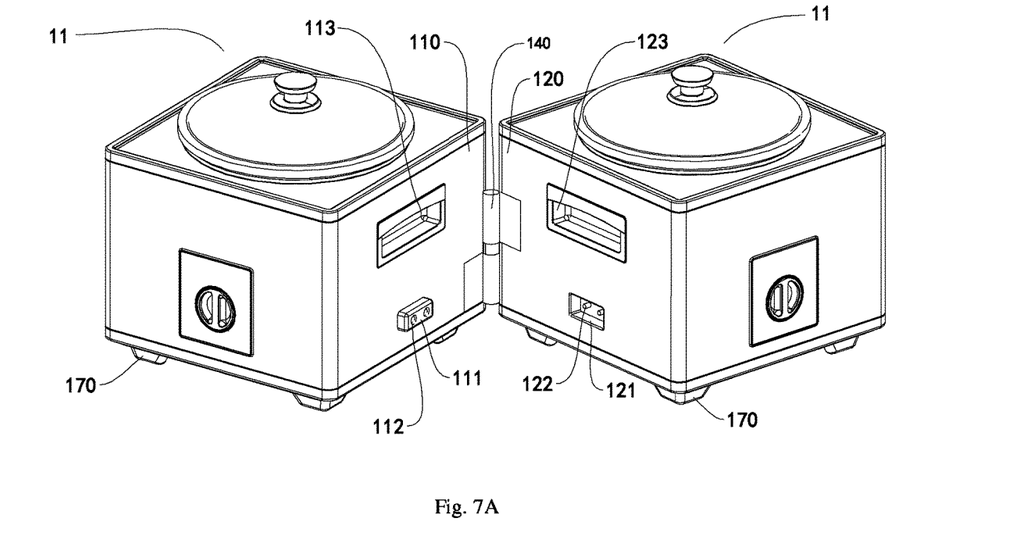
FIG. 7A is a schematic view of two electric cookers of an electric cooking device according to another embodiment of the present invention, in which the two electric cookers are in a connected state.

In some embodiments, as shown in FIG. 7A, the adjacent electric cookers 11 are detachably connected with each other via a hinge or a snapping structure 140. For example, the snapping structure 140 comprises a snap tongue (not shown) disposed on one of the adjacent electric cookers 11 and a snap groove (not shown) disposed in the other of the adjacent electric cookers 11, so that the adjacent electric cookers 11 are connected by fitting the snap tongue into the snap groove. Therefore, the connection strength between adjacent electric cookers 11 may be further improved.

Figure 7B:
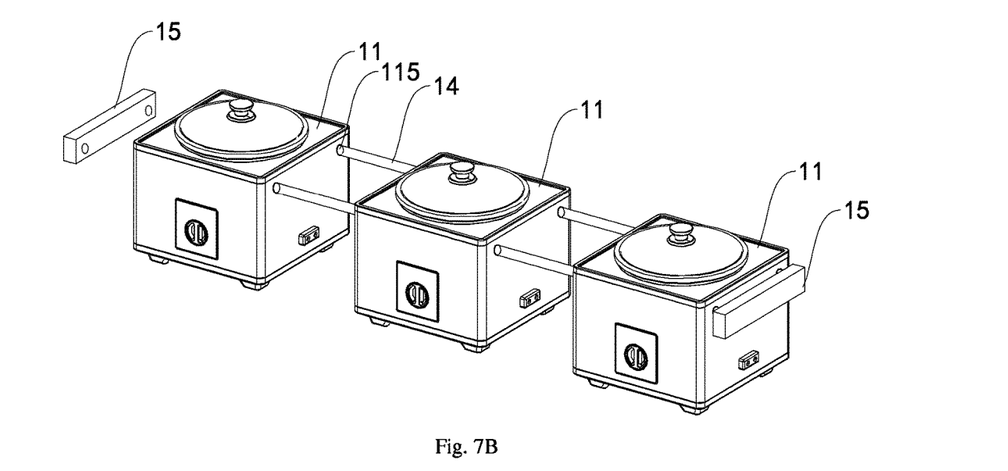
FIG. 7B is a schematic view of an electric cooking device according to a further embodiment of the present invention.
Figure 7C:
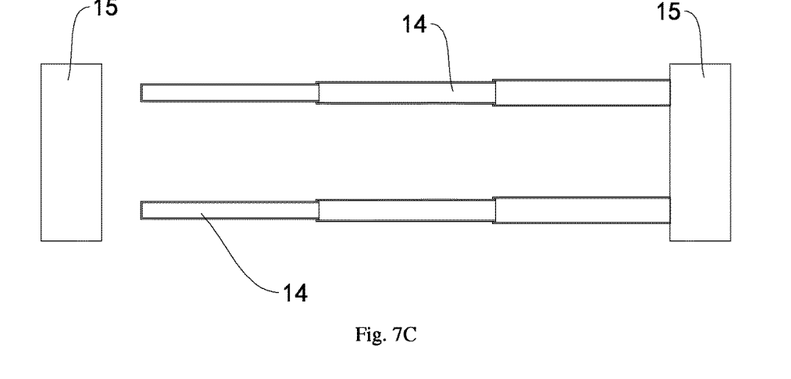
FIG. 7C is a schematic view of a connecting rod and a gripping element of an electric cooking device according to a further embodiment of the present invention.

In some embodiments, the adjacent electric cookers 11 may also be detachably connected via other connecting structures. In one embodiment, as shown in FIG. 7B, each of the adjacent electric cookers 11 may comprise a through hole 115, and a connecting rod 14 is inserted into through holes 115 of the plurality of electric cookers 11. By pulling the connecting rod 14 out of the through holes 115, the plurality of electric cookers 11 are disconnected from each other. Specifically, each of the electric cookers 11 comprises two parallel through holes 115, and two connecting rods 14 are disposed to connect the electric cookers 11. In an embodiment, a gripping element 15 such as a handle is disposed at an end of the connecting rod 14.

In another embodiment, two connecting rods 14 are provided to connect the electric cookers 11, and first and second gripping elements 15 are disposed on opposite ends of each of the two connecting rods 14. The first gripping element 15 (right gripping element 15 as shown in FIG. 7B) may be fixed with the connecting rods 14, and the second gripping element 15 (left gripping element 15 as shown in FIG. 7B) may be detachably connected with the connecting rods 14.

In one embodiment, the connecting rod 14 is configured as an extendable and retractable rod, so that the length of the connecting rod 14 is changeable so as to adapt to the number of the electric cookers 11. For example, the connecting rod 14 may have a telescopic structure.

Figure 8:
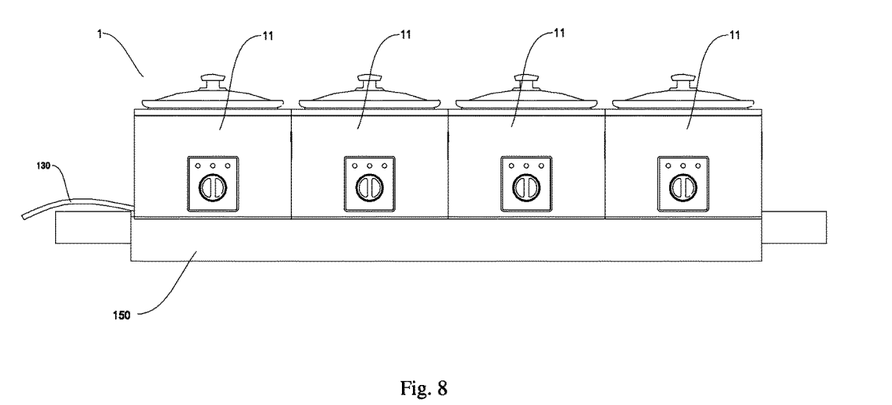
FIG. 8 is a schematic view of an electric cooking device according to a further embodiment of the present invention.
Figure 9:
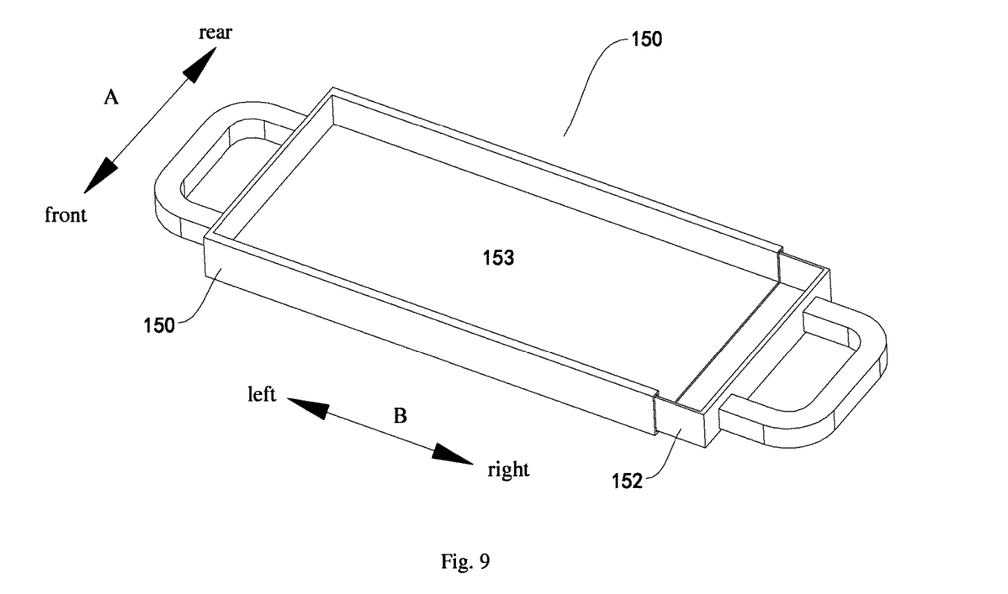
FIG. 9 is a schematic view of a tray of an electric cooking device in a retracted state according to a further embodiment of the present invention.
Figure 10:
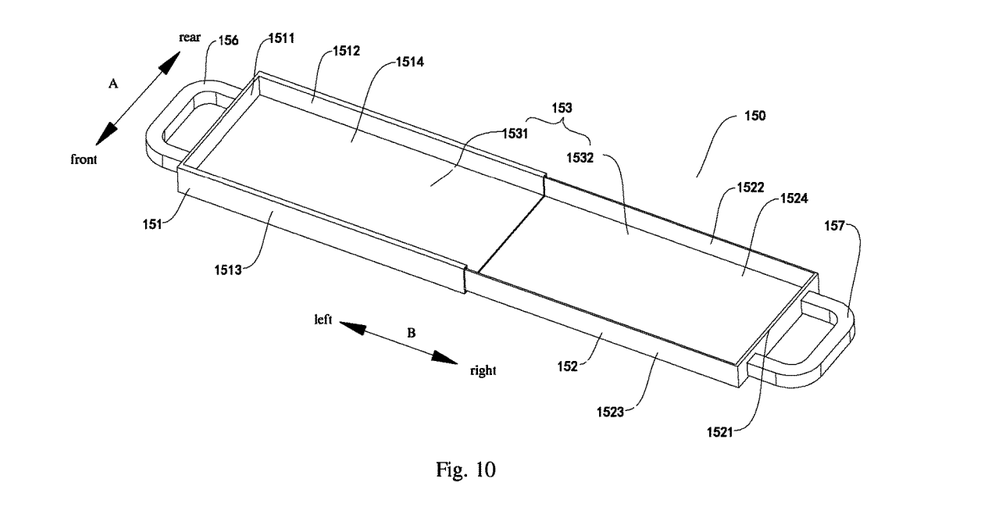
FIG. 10 is a schematic view of a tray of an electric cooking device in an extended state according to a further embodiment of the present invention.

An electric cooking device 1 according to another embodiment of the present invention will be described with reference to the FIGS. 8-10.

In some embodiments, the electric cooking device 1 further comprises a tray 150. The tray 150 defines a containing groove 153 to receive the plurality of electric cookers 11 combined. The plurality of electric cookers 11 may be placed in the containing groove 153 conveniently, and it is more convenient convey or move the plurality of electric cookers 11 with the tray 150.

In some embodiments, the tray 150 comprises a first tray part 151 and a second tray part 152 which are coupled with and moveable relative to each other so as to change a size of the containing groove 150. As the first and second tray parts 151, 152 are movable relative to each other, the length (such as the length in the left-right direction B in FIGS. 9-10) and volume of the containing groove 150 can be adjusted conveniently as desired.

According to the number of the electric cookers 11 to be combined, the second tray part 152 may be moved with respect to the first tray part 151 to change the size of the containing groove 153, thus adjusting the size of the containing groove 153, so that the size of the containing groove 153 is adapted to that of the electric cooking device 1.

Specifically, the first tray part 151 comprises an end wall 1511, a front wall 1513, a rear wall 1512 and a bottom wall 1514. The front wall 1513 and the rear wall 1512 are spaced from each other in the front-rear direction A, the end wall 1511 is connected with left ends of the front wall 1512 and the rear wall 1513 respectively, the end wall 1511 is disposed at the left end of the bottom wall 1514, and the front wall 1513 and the rear wall 1512 are disposed at the front edge and the rear edge of the bottom wall 1514 respectively, thus defining a substantial U-shaped first containing groove member 1531. The first containing groove member 1531 has an open right end and a bottom. The first containing groove member 1531 comprises a front guide groove having an open right end and formed in the front wall 1513, and a rear guide groove having an open right end and formed in the rear wall 1512.

The second tray part 152 comprises an end wall 1521, a rear wall 1522, a front wall 1523 and a bottom wall 1524. The rear wall 1522 and the front wall 1523 are spaced from each other in the front-rear direction A, and the end wall 1521 is connected with left ends of the rear wall 1522 and the front wall 1523 respectively. The end wall 1521 is disposed at the left end of the bottom wall 1524 and the front wall 1523 and the rear wall 1522 are connected with the front side edge and the rear side edge of the bottom wall 1524 respectively. In that way, a substantial U-shaped second containing groove member 1532 is defined, and the second containing groove member 1532 has an open left end and a bottom.

The first and second containing groove members 1531, 1532 form the containing groove 153. The front wall 1523 of the second tray part 152 is fitted slidably in the front guide groove of the front wall 1513 of the first tray part 151 along the direction A, and the rear wall 1522 of the second tray part 152 is fitted slidably in the rear guide groove of the rear wall 1512 of the first tray part 151 along the direction A. Thereby, the second tray part 152 is movable relative to the first tray part 151, and the size (the size in direction A) of the containing groove 153 may be adjusted with the movement of the second tray part 152. FIG. 9 shows the tray 150 in a retracted state. FIG. 10 shows the support 150 in an extended state.

In some embodiments of the present invention, a first handle 156 having a substantial U-shape may be disposed on an outer surface of the end wall 1511, and a second handle 157 having a substantial U-shape may be disposed on an outer surface of the end wall 1521. With the first and second handles 156, 157, it is more convenient to carry or convey the electric cooking device 1.

The electric cooking device 1 according to embodiments of the present invention is convenient to use, flexible in combination, and small in occupied space.

In the description, Unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present invention be constructed or operated in a particular orientation.

In the present application, terms such as "first" and "second" are used herein for purposes of description and are not intended to indicate or imply relative importance or significance. Term "plurality" can be understood as two or more than two, unless expressly described otherwise.

Unless specified or limited otherwise, the terms "mounted," "connected," "coupled," and "secured" and variations thereof are used broadly, such as rigid attachments, also movable attachments, or integrated attachments; mechanical connections, also refer to a relationship wherein structures are secured or attached to one another either directly or indirectly through intervening structures, or structures having their interiors connected. As to those skilled in the art, specific meaning of the above mentioned terms in the present invention can be understood in accordance with specific conditions.

In the description of the present invention, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on," "above," or "on top of" a second feature may include an embodiment in which the first feature is right "on," "above," or "on top of" the second feature, and may also include an embodiment in which the first feature is not right "on," "above," or "on top of" the second feature, or just means that the first feature has a sea level elevation larger than the sea level elevation of the second feature. While first feature "beneath," "below," or "on bottom of" a second feature may include an embodiment in which the first feature is right "beneath," "below," or "on bottom of" the second feature, and may also include an embodiment in which the first feature is not right "beneath," "below," or "on bottom of" the second feature, or just means that the first feature has a sea level elevation smaller than the sea level elevation of the second feature.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present invention. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:
1. An electric cooking device comprising:
a plurality of electric cookers which are capable of cooking ingredients therein independently,
wherein adjacent electric cookers of the plurality of the electric cookers are detachably connected with each other,
wherein each of the electric cookers defines a first side and a second side, and comprises a first electric connector disposed on the first side and a second electric connector disposed on the second side,
wherein the first electric connector of one electric cooker of the adjacent electric cookers is adapted to electrically connect with the second electric connector of the other electric cooker of the adjacent electric cookers via a plug and socket relationship, wherein each of the electric cookers comprises an outer pot and at least one inner pot adapted to dispose in the outer pot and to contain ingredients, wherein each of the electric cookers comprises a protrusion disposed on the first side and a recess disposed in the second side, wherein the first electric connector is a female contact disposed on the protrusion and the second electric connector is a male contact disposed in the recess, and wherein the protrusion of the one electric cooker of the adjacent electric cookers is adapted to fit within the recess of the other electric cooker of the adjacent electric cookers.

2. The electric cooking device according to claim 1, wherein the adjacent electric cookers are detachably connected by means of the first the electric connector of the one electric cooker and the second the electric connector of the other electric cooker.

3. The electric cooking device according to claim 2, wherein the first electric connector is a magnetic socket, and the second electric connector is a magnetic plug.

4. The electric cooking device according to claim 1, wherein the first side of the electric cooker is opposed to the second side thereof, the electric cookers are detachably connected in turn so as to form an electric cooker row.

5. The electric cooking device according to claim 4, wherein a power cable is detachably connected with one of the first electric connector of the electric cooker located at a first end of the electric cooker row and the second electric connector of the electric cooker located at a second end of the electric cooker row, wherein the other one of the first electric connector of the electric cooker located at the first end of the electric cooker row and the second electric connector of the electric cooker located at the second end of the electric cooker row is sealed by a cover.

6. The electric cooking device according to claim 1, wherein each of the electric cookers comprises a control knob.

7. The electric cooking device according to claim 1, wherein each of the electric cookers is adapted to be detachably connected with a power cable.

8. The electric cooking device according to claim 7, wherein each of the electric cookers comprises a cable-winding bracket configured to wind the power cable thereon.

9. The electric cooking device according to claim 7, each of the electric cookers comprises a cable receiving cavity configured to receive the power cable, and a door configured to open or close the cable receiving cavity.

10. The electric cooking device according to claim 1, further comprising a tray defining a containing groove to receive the plurality of electric cookers.

11. The electric cooking device according to claim 10, wherein the tray comprises a first tray part and a second tray part which are coupled with and moveable relative to each other so as to change a size of the containing groove.

12. The electric cooking device according to claim 1, wherein the first side includes a bottom surface and the second side includes an upper surface, wherein each of electric cookers comprises a leg on the bottom surface thereof and a retaining groove in the upper surface thereof, when one electric cooker is stacked on another electric cooker, the retaining groove of the another electric cooker retains the leg of the one electric cooker.

13. The electric cooking device according to claim 12, wherein a flange is disposed on the upper surface of each of the electric cookers to define the retaining groove.

14. The electric cooking device according to claim 1, wherein each of the electric cookers comprises first and second gripping grooves opposed to each other.

15. The electric cooking device according to claim 14, wherein each of the electric cookers defines first and second sides opposed to each other, wherein the first gripping groove is formed in the first side, and the second gripping groove is formed in the second side, wherein a first handle is disposed in the first gripping groove and capable of extending out of and retracting into the first gripping groove, and a second handle is disposed in the second gripping groove and capable of extending out of and retracting into the second gripping groove.

16. The electric cooking device according to claim 1, wherein the adjacent electric cookers are detachably connected with each other via a hinge or a snapping structure.

17. The electric cooking device according to claim 1, wherein each of the electric cookers comprises a through hole, and the plurality of the electric cookers are connected via a connecting rod inserted into the through holes of the electric cookers.

18. An electric cooking device comprising:

a plurality of electric cookers which are capable of cooking ingredients therein independently, wherein adjacent electric cookers are detachably connected with each other, wherein each of the electric cookers defines a first side and a second side, and comprises a first electric connector disposed on the first side and a second electric connector disposed on the second side, wherein the first electric connector of one electric cooker of the adjacent electric cookers is adapted to connect with the second electric connector of the other electric cooker of the adjacent electric cookers, wherein the first side of the electric cooker is opposed to the second side thereof, the electric cookers are detachably connected in turn so as to form an electric cooker row, wherein a power cable is detachably connected with one of the first electric connector of the electric cooker located at a first end of the electric cooker row and the second electric connector of the electric cooker located at a second end of the electric cooker row, wherein another of the first electric connector of the electric cooker located at the first end of the electric cooker row and the second electric connector of the electric cooker located at the second end of the electric cooker row is sealed by a cover, wherein each of the electric cookers comprises a protrusion disposed on the first side and a recess disposed in the second side, wherein the first electric connector is a female contact disposed on the protrusion and the second electric connector is a male contact disposed in the recess, and wherein the protrusion of one electric cooker of the adjacent electric cookers is adapted to fit within the recess of the other electric cooker of the adjacent electric cookers.

19. An electric cooking device comprising:

a plurality of electric cookers which are capable of cooking ingredients therein independently, wherein adjacent electric cookers are detachably connected with each other, wherein each of the electric cookers comprises first and second gripping grooves opposed to each other, wherein each of the electric cookers defines first and second sides opposed to each other, wherein the first gripping groove is formed in the first side, and the second gripping groove is formed in the second side, wherein a first handle is disposed in the first gripping groove and capable of extending out of and retracting into the first gripping groove, and a second handle is disposed in the second gripping groove and capable of extending out of and retracting into the second gripping groove, wherein each of the electric cookers defines a first side and a second side, and comprises a first electric connector disposed on the first side and a second electric connector disposed on the second side, wherein the first electric connector of one electric cooker of the adjacent electric cookers is adapted to connect with the second electric connector of the other electric cooker of the adjacent electric cookers, wherein each of the electric cookers comprises a protrusion disposed on the first side and a recess disposed in the second side, wherein the first electric connector is a female contact disposed on the protrusion and the second electric connector is a male contact disposed in the recess, and wherein the protrusion of one electric cooker of the adjacent electric cookers is adapted to fit within the recess of the other electric cooker of the adjacent electric cookers.

* * * * *